United States Patent [19]
Roach et al.

[11] 3,915,679

[45] Oct. 28, 1975

[54] VORTEX AIR CLEANER ARRAY

[75] Inventors: Charles J. Roach, Brooklyn; Conrad A. Mitchell, Bronx, both of N.Y.

[73] Assignee: Pall Corporation, Glen Cove, N.Y.

[22] Filed: Apr. 16, 1973

[21] Appl. No.: 351,757

[52] U.S. Cl. .................. 55/347; 55/348; 55/391; 55/396; 55/423; 55/426; 55/449; 55/450; 55/457; 60/311
[51] Int. Cl.[2] ......................................... B01D 45/12
[58] Field of Search ............ 55/210, 212, 218, 338, 55/306, 346, 347, 348, 392–399, 423–427, 431, 435, 448–454, 456–457, 462, 391; 60/39.09, 311

[56] References Cited
UNITED STATES PATENTS

| | | | |
|---|---|---|---|
| 2,323,707 | 7/1943 | Danz | 55/347 |
| 2,489,618 | 11/1949 | Cantin | 55/396 X |
| 2,662,610 | 12/1953 | Heinrich | 55/348 X |
| 2,818,935 | 1/1958 | Kemmetmuller | 55/348 |
| 3,421,296 | 1/1969 | Beurer | 55/306 |
| 3,444,672 | 5/1969 | Alsobrooks | 55/306 |
| 3,483,676 | 12/1969 | Sargisson | 55/306 |
| 3,520,114 | 7/1970 | Pall et al. | 55/347 |
| 3,590,560 | 7/1971 | Pall et al. | 55/396 UX |
| 3,611,679 | 10/1971 | Pall | 55/457 |
| 3,713,280 | 1/1973 | Keller et al. | 55/396 X |

FOREIGN PATENTS OR APPLICATIONS

| | | | |
|---|---|---|---|
| 192,385 | 10/1957 | Austria | 55/396 |

*Primary Examiner*—Frank W. Lutter
*Assistant Examiner*—Kathleen J. Prunner

[57] ABSTRACT

An array of closely spaced vortex air cleaners is provided for efficiently removing contaminant particles from relatively high velocity air with a low pressure drop. The array comprises a housing defining a scavenge chamber for reception of contaminant particles with provision for feed of contaminant-laden air to be cleaned to the inlets of the vortex air cleaners, and for recovery of clean air from the outlets of the vortex air cleaners. The vortex air cleaners of the array have a tubular body, with an inlet at one end, an outlet at the opposite end, and a central passage therebetween; a deflector coaxially mounted in the passage adjacent the inlet creating a vortex stream of influent air in the passage with a generally coaxially tubular outlet member positioned within the outlet end of the tubular body, separating the contaminant particles at the periphery from relatively clean air at the core of the turbulent flow of air through the passage; the tubular outlet member defining an annular passage between it and the tubular body for reception of the contaminant particles in the peripheral flow through the central passage, and discharge of such particles in the scavenge chamber; and a flow restrictor at the entry to the annular passage from the central passage and spaced downstream from the inlet end of the tubular outlet member; the inlet end of the tubular outlet member terminating in a thin annulus cutting out and separating a core of clean air entering the tubular outlet member from a peripheral flow of contaminant-laden air entering the annular passage; and the flow restrictor defining an annular orifice at the entry of the annular passage to maintain a higher pressure within the central passage than downstream of the annular passage, such as in the scavenge chamber, or the ambient atmosphere.

17 Claims, 8 Drawing Figures

VORTEX AIR CLEANER ARRAY

Air entering an engine, most notably diesel and gas turbine engines, must be substantially free of dust or sand or the engine can become severely damaged in a relatively short time. One means for removing sand or dust from air entering an engine has been to provide tubular air cleaners. These air cleaners remove dust from air by causing a vortex or cyclone stream in the dust-laden air passing through the tube. This is accomplished by either placing a deflector in the tube in the path of the influent air stream or by introducing the air stream at a tangent to the tube wall. Since the dust and dirt particles are relatively heavy, they are thrown to the periphery of the tube due to the centrifugal force of the vortex stream. The air at the center of the tube is left relatively free of dust particles. The relatively clean air is normally drawn off from the center of the tube and the dust particles collected at the periphery of the tube.

Devices of this type have been employed on engines in earth moving equipment, marine equipment, stationary power plants, over-the-road vehicles and aircraft. Such engines can encounter clouds of dirt and dust which if ingested can rapidly destroy the engine. For example, during landing and take-off a typical small helicopter engine can ingest approximately ½ pound of dirt per minute if no air cleaner is provided; larger helicopters can ingest 2 to 4 pounds of dirt per minute without an air cleaner. This has resulted in engine failure on helicopters in combat operations in less than 10% of their normal service period, due to dirt-caused erosion of the engine. Thus, the problem of removing the dirt from the influent air to such engines is very serious.

Vortex air cleaners have been provided to remove dirt from air entering an engine. These air cleaners form a vortex or cyclone stream of the dirt-laden air passing through a tube, either by placing a deflector in the tube in the path of the influent air stream, or by introducing the air stream tangentially to the tube wall. Since the dirt particles are relatively heavy, they are thrown to the periphery of the vortex. The air at the center of the vortex is left relatively free of dirt particles. The clean air is normally drawn off from the center of the tube, and the dirt particles collected at the periphery of the tube.

The term "vortex air cleaner" as used herein thus refers to an air cleaner which comprises a straight tubular air cleaner body having a central passage with an inlet and an outlet at opposite ends; a deflector adjacent the inlet for creating a vortex stream in the influent air to concentrate any contaminant particles in the air at the periphery of the passage, and clean the air at the center of the passage; and an outlet member having a central clean air passage communicating with the central passage of the tubular body and disposed within the passage at the outlet, the exterior wall of the outlet member defining a generally annular contaminant scavenge passage within the outlet end of the tubular body through which pass contaminant particles while relatively clean air at the center of the passage passes through the central clean air passage of the outlet member.

Vortex air cleaners have the advantage that the inlet restriction and therefore the pressure drop between the inlet and outlet is quite low. Thus, they cause little power loss to the engine.

Furthermore, if a scavenge flow of air is employed to sweep contaminant particles from the assembly, higher cleaning efficiencies can be obtained, and the unit becomes self-cleaning.

In order to provide a large capacity for dirt removal, it is necessary of course to use a large vortex air cleaner unit. As a practical matter, for space considerations, it is undesirable to use a single large vortex air cleaner, and an array of small vortex air cleaners has therefore been employed, in one or several banks. Pressure distribution in the scavenge chamber from individual air cleaners of the array normally poses a problem if scavenge flow is drawn off from one end of the scavenge chamber. If pressure distribution is not uniform, the efficiency of the array in dirt removal drops, will frequently be well below that of the individual units of the array, taken singly, and may even be unacceptable to cope with existing dirt conditions.

The term "vortex air cleaner array" as used herein refers to an assembly composed of a plurality of vortex air cleaners mounted together as a unit in a housing with their axes aligned in parallel, or a group of such assemblies. The vortex air cleaners are normally held in a housing between supports which hold the vortex air cleaners in position at their inlets and outlets. The scavenge passages of the vortex air cleaners empty into a common scavenge chamber in the housing which is separated from the air cleaner inlets and clean air outlets. A scavenge port is provided in a wall of the housing communicating with the scavenge chamber, for the removal of contaminant particles therefrom. The clean air outlets of the air cleaners open into a space beyond the scavenge chamber, and the clean air thus runs straight through the air cleaners, at high velocity. It is considered important to have the clean air follow a straightthrough course, to minimize pressure drop.

U.S. Pat. No. 3,520,114, dated July 14, 1970, to David B. Pall and Robert I. Gross, describes one type of vortex air cleaner array useful in aircraft, including flow-restricting means in the line of flow between the scavenge port of the array and the scavenge passage of selected vortex air cleaners, to restrict the scavenge flow therefrom, and to minimize the variation in scavenge flow among all air cleaners of the array, thereby providing substantially uniform scavenge flow for all vortex air cleaners of the array.

In accordance with the invention, a vortex air cleaner array is provided that removes substantially all particles from contaminant laden influent air while minimizing the pressure drop across the air cleaner, whether singly or in an array. This has been done by providing a flow restrictor at the entry to the annular passage from the central passage and spaced downstream from the inlet end of the tubular outlet member, the inlet end of the tubular outlet member terminating in a thin annulus cutting out and separating a core of clean air entering the tubular outlet member from a peripheral flow of contaminant-laden air entering the annular passage, and the flow restrictor defining an annular orifice at the entry to the annular passage to maintain a higher pressure within the central passage than downstream of the annular passage, such as in the scavenge chamber or the ambient atmosphere.

The vortex air cleaners in the arrays of this invention comprise a tubular body, preferably less than about two inches in diameter, and having an inlet and an outlet; an angularly vaned deflector disposed at the inlet body; the deflector being adapted to create a vortex stream in the influent air to concentrate any contaminant particles in the air at the periphery of the tubular body, and provide a core of clean air at the center of the tubular body; a generally tubular outlet member disposed in the outlet of the tubular body and having an end of smaller diameter than the tubular body, defining a generally annular space therebetween through which pass contaminant particles at the periphery of the tubular body, while relatively clean air at the center of the tubular body passes through the central passage of the outlet member, the tubular outlet member defining an annular passage between it and the tubular body for reception of the contaminant particles in the peripheral flow through the central passage; and a flow restrictor at the entry to the annular passage from the central passage and spaced downstream from the inlet end of the tubular outlet member, the inlet end of the tubular outlet member terminating in a thin annulus cutting out and separating a core of clean air entering the tubular outlet member from a peripheral flow of contaminant-laden air entering the annular passage, and the flow restrictor defining an annular orifice at the entry to the annular passage to maintain a hig cles to the periphery of the body and ensure that they hit or closely approach the wall of the body before they reach the outlet.

The deflector is designed to impart sufficient force to the vortex stream for a given influent flow to attain this result. Moreover, this is accomplished without producing an undesirably high pressure drop across the air cleaner due to the improved air flow configuration.

The deflector can be bonded in place in the tubular body any means known to those skilled in the art or it can be merely press-fitted in position.

The deflector should be relatively long and the vanes should occupy preferably less than one half the effective length of the tube. The vanes should not occupy more than 60% of the effective length of the tube, or the pressure drop across the assembly will be too high, and poor separation will result.

The deflector can be composed of about three to six helical vanes, which are supported at their centers preferably on a central hub. Four vanes are preferred. The vanes if desired can be tapered in thickness from front to back to reduce the pressure drop across the assembly.

It is important that the pitch length of the vanes be selected such that there is zero daylight from front to back of the deflector. This means that no influent particles can pass through the separator without being deflected from a straightthrough course. A pitch length of about 1.7 to about 1.9 inches and preferably from about 1.75 inches to about 1.85 inches for a tube of 0.677 inch in diameter is sufficient to ensure that no particle can pass through the deflector without being deflected.

The ratio of the pitch length of the vanes of the deflector to the inside tube diameter (or the diameter of the deflector) has been found to be quite significant to the pressure drop and efficiency of separation of particles of the air cleaner tube. It has been determined through experiment in accordance with this invention that the ratio of pitch length to diameter which provides that best balance of low pressure drop and high efficiency can be determined by the equation:

$$Pl = Kd^{0.68}$$

where d = inside diameter of tube,

Pl = Pitch length, and K is a proportionality constant equal to 2.35 when both pl and $d$ are in inches.

This equation has been found to apply to deflectors of both less than and greater than one inch in diameter. The equation given above specifies the optimum pitch length for a deflector of a given diameter to obtain a good balance of low pressure drop and pressure drops can be obtained within a range ratio both above and below the optimum pitch length to diameter ratio. In general, for most deflector diameters, it has been found that a satisfactory efficiency can be obtained at a relatively low pressure drop when the K in the above equation is within the range from about 2.2 to about 3.2 and preferably within the range from about 2.25 to about 2.50.

The deflector preferably has a forwardly extending blunt tip which protrudes beyond the vanes of the deflector for a distance of approximately 0.25 inch. This blunt tip is preferably a cylindrical rod which is an extension of the hub and which has a flat end portion. A dome-like end can also be used. These configurations of the hub end assist in guiding air toward the vanes of the deflector without increasing turbulence in the flow. Thus, the tip improves the efficiency of separation without adding to the pressure drop across the unit.

Moreover, the upstream tip provides a convenient member for supporting a guard screen across the front of the tube.

The tip diameter will normally be the same as the hub and should be selected to obtain a balance of low pressure drop and efficient separation. The hub diameter should not be too large or the pressure drop across the assembly will be increased.

Moreover, if the hub diameter is larger than about 0.25 inch, the boundary layer of air around the hub will become unduly large and a large particle in the boundary layer could possibly pass through the assembly without being removed from the clean air stream at the center of the tube.

However, if the hub diameter is too small, the efficiency of separation is impaired. The ratio of the hub diameter to the diameter of the span of the deflector vanes which obtains the best balance of low pressure drop and separation efficiency is within the range from about 0.20 to about 0.40, and preferably is within the range from about 0.24 to about 0.28. For example, for a 0.677 inch tubular body diameter, the optimum hub diameter is 0.17 inch, and the preferred range of hub diameters is about 0.16 to about 0.19 inch.

The downstream end of the deflector is provided with a rearwardly projecting conical tip, which extends beyond the vanes within the central passage, but not into the tubular outlet member. This conical tip aids in creating the vortex stream by preventing turbulence in the air leaving the deflector thereby improving the efficieny of separation. The conical tip should be formed to a cone angle of between 30° and 60° and preferably between 36° and 50°. If the conical tip is formed to these angles it will not add to the pressure drop across the vortex tube and separation efficiency will be increased. The cone angle as used here is the angle between the two sides of the cone and is thus twice the angle from one side to the axis.

The deflector can be made of the same or of different material from the tubular body. Abrasion resistant long wearing materials, such as nylon, polytetrafluoroethylene, polyphenylene oxide, polypropylene and polycarbonate, as well as metals, such as steel, stainless steel, nickel alloys, and the like, are suitable.

An outlet member is provided at the outlet end of the tubular body. This outlet member is generally tubular and is preferably frustoconical in shape. It has an inlet end that is smaller in diameter than the tubular body. This end extends into the outlet of the tubular body. The outlet member defines an annular space between it and the tubular body at the periphery of the tube through which the dust particles are removed. The central passage of the outlet tube is located at the center of the tubular body and clean air is drawn from the assembly through the center of the outlet.

The outlet member should extend into the outlet end of the tubular body for a distance that is equal to from about 0.10 to about 0.25 times the diameter of the tube. The outlet member can be supported in position by tabs, which can be formed on the outlet member and extend to the separator body; it can also be supported by a back plate.

It is also possible to provide several lugs, usually four, on the end of the outlet member that is within the tubular body. These lugs align the outlet members in the outlet of the tubular body.

The ratio of the outside diameter of the outlet tube to the inside diameter of the tubular body at the point where the outlet is located can be within the range from about 0.60 to about 0.97 inch.

At the inlet end of the annular passage between the tubular outlet member and the tubular body is a flow restrictor, extending across the inlet from either the tubular outlet member, or the tubular body, or both, or supported within the inlet by other means, reducing the inlet to an annular orifice. The flow restrictor reduces flow from the peripheral region of the vortex in the central passage of the tubular body into the annular passage, and has the effect of increasing pressure in the central passage with respect to the air pressure downstream of the annular passage, and of ensuring that the pressure in the central passage is higher than the pressure in the scavenger chamber, under operating conditions.

It is however important that the flow restrictor be spaced downstream from the inlet end of the tubular outlet member, and that the inlet end present a thin annulus to the helical vortex, so as to cut and separate the core of clean air from the core of the contaminant-laden air, deflecting the latter towards the annular orifice inlet to the annular passage. Hence, the flow restrictor is spaced a short distance from the inlet end, at least about 10% of the air inlet diameter of the tubular outlet member, but within the annular passage, and defines an annular orifice having a width from about 2 to about 10% of the inside diameter of the central passage of the tubular body at the inlet end of the tubular outlet member. The size within the stated range is slected to maintain a higher pressure in the central passage than in the scavenge chamber under the operating conditions.

The flow restrictor is preferably a circumferential flange or rib about the external periphery of the tubular outlet member, or the internal periphery of the tubular body. It can be shaped to present a perpendicular or sloping surface of flow, sloping toward or away from the annular orifice defined thereby. The length or span of the flow restrictor and of the orifice defined thereby axially of the annular passage can be wholly or fully the length of the passage, and is not critical.

The flow restrictor can also be placed partially on the tubular body and partially on the tubular outlet member, each portion projecting towards the other across the annular passage, and defining the annular orifice therebetween. The resulting orifice can be straight-sided, or the orifice can be in the form of a passage, which can be straight, or curved, or dog-legged, or tortuous, in order to produce the required pressure drop therethrough.

It is usually preferable to form the flow restrictor as an integral part of the tubular body and/or tubular outlet member, by molding or casting or machining, but it can also be an annular ring or tube that is bonded or otherwise attached thereto.

If the air cleaner is to be used in environments where large particles can be expected to be encountered, too large to pass through the annular orifice defined by the flow restrictor, a large opening or hole can be provided in the flow restrictor, by removing a segment thereof, or providing a passage therethrough of larger diameter than the orifice, in one or several locations. However, when this is done, the required flow restriction is maintained by further restricting the annular orifice.

The air cleaners of the invention are preferably used in an array in which the air cleaners are arranged in parallel, entirely or in groups, presenting a flat surface configuration to incoming flow. They can also be arranged in other spatial configurations, such as radially about an open curved central passage, or spherically about a segment of a sphere. To save space, the cleaners can be put in rows, with the rows offset so as to nest cleaners of adjacent rows in the spaces between cleaners of each row. The tubular bodies of the air cleaners can be held in a front plate, and the tubular outlet members can be held in a back plate, spaced apart from the front plate, and the plates attached together to form a housing with the scavenge chamber in between. The annular passages of the cleaners then open into the space between the front and back plates, which is the scavenge chamber, while the central passages of the tubular outlet members open beyond the back plate.

The clean air can be taken off in a clean air conduit to the engine, and the contaminants removed from the scavenge chamber between the plates. Any means can be provided to remove particles from this chamber, such as operating the system under a positive pressure, or a blower, compressor or eductor at the outlet of the scavenge chamber, drawing contaminants from the air cleaner. An eductor is preferred.

In operation, influent contaminant-laden air enters the tubular body and encounters the vaned deflector. The vanes of the deflector form a vortex stream in the influent air and the dust particles since they are relatively heavy are thrown to the periphery of the tube, leaving the air at the center relatively dust-free. The contaminant particles are collected at the periphery of the tube and are drawn off from the annular space between the outlet member and the tubular body into the scavenge chamber. Clean air is drawn off from the center of the tubular body through the central passage of the outlet.

Figure 1:
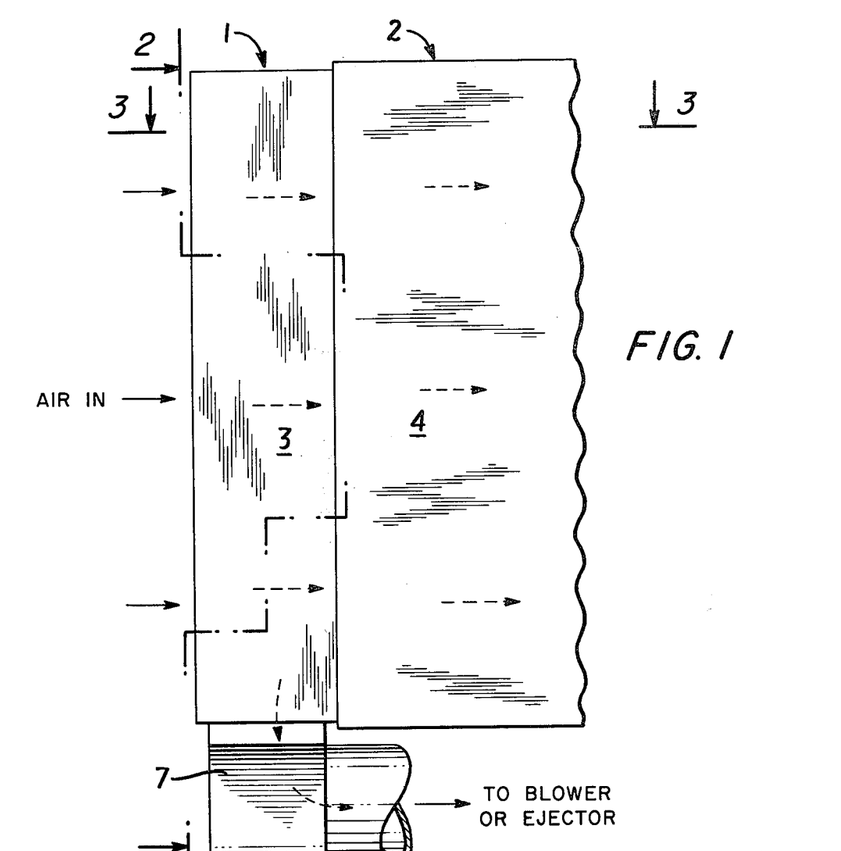
FIG. 1 is a schematic representation from the side of a vortex air cleaner array in accordance with the invention, mounted to the air intake line of an engine.
Figure 2:
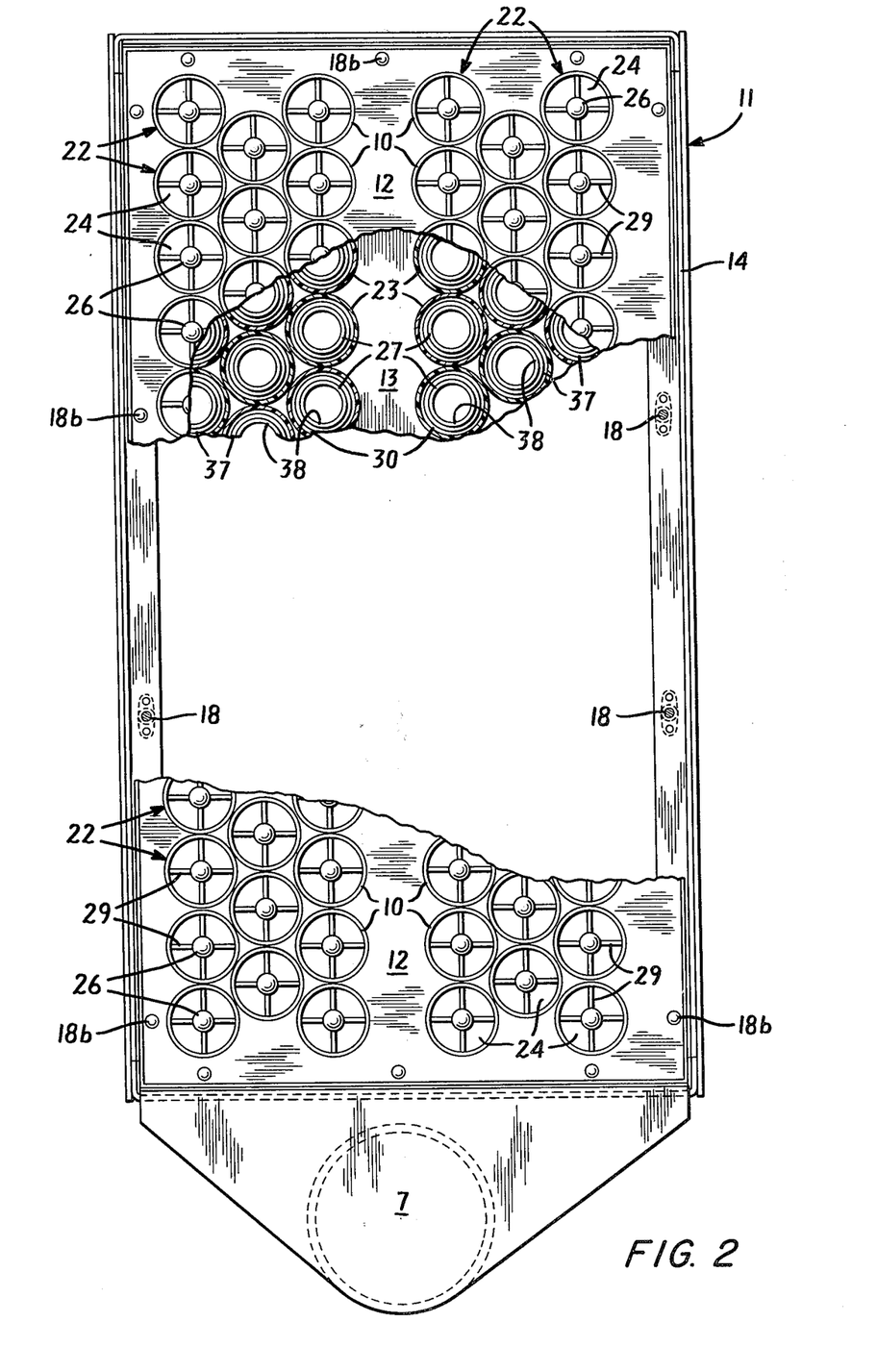
FIG. 2 is a front view, partly in section, of the inlet end of the vortex air cleaner array of FIG. 1 taken along the line 2—2 of FIG. 1.
Figure 3:
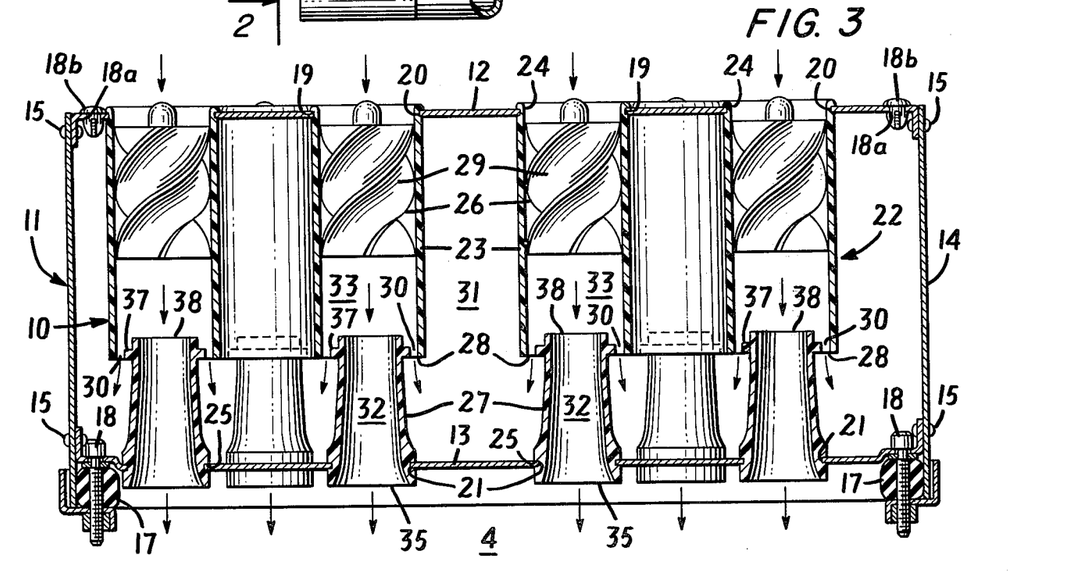
FIG. 3 is a partial longitudinal section through the vortex air cleaner array of FIG. 1, taken along the line 3—3 of FIG. 1.

The vortex air cleaner array of FIGS. 1 to 3 comprises an array 3 of vortex air cleaners mounted to the inlet duct 4 at the air intake (not shown) of an engine. An outlet line connection 7 from the air cleaner array is connected to a blower for scavenge air flow to remove dirt separated by the vortex air cleaners.

The vortex air cleaner array 3 (best seen in FIGS. 2 and 3) comprises an array of vortex air cleaners 10 supported in an air cleaner housing 11 comprising a vortex air cleaner plate 12 and an outlet tube 13 closing off the open end of an enclosing shell 14. The vortex air cleaner and outlet tube plates 12 and 13 are turned 90° at their periphery, and are held to the shell 14 by rivets 15. The inner plate is shock-mounted to the inlet duct 4 through rubber air seals 17 and bolts 18, access to which is provided by apertures 18a and removable plugs 18b in plate 12.

The vortex air cleaner and outlet tube plates 12, 13 are formed with a plurality of apertures 20 and 21. The apertures 20 accommodate and support the vortex air cleaner tubes 22. Each vortex tube 22 comprises a tubular housing 23 having a central passage 33, an inlet 24 and an outlet 28. A vortex generator 26 is integral with housing 23 and is disposed within the central passage 33 adjacent the inlet 24. The housing 23 is made of asbestos- or glass-filled polypropylene. The vanes 29 of the vortex generator 26 are helical.

The apertues 21 accommodate and support the generally tapered tubular outlet tubes 27, disposed with one end extending into the outlet 28 of the passage 33. The outlet tubes have a central open passage 32 therethrough for the removal of clean air. The outlet tubes define an annular space 30 between the vortex generator housing 23 and the outer periphery of the outlet tube 27, for the removal of dirt particles.

A peripheral or circumferential flange 37 near the inlet end 38 of each outlet tube 27 constitutes a flow restrictor, and reduces the diameter of the annular passage 30 to an annular orifice. The flange 37 restricts flow through the passage 30 to ensure that the pressure in central passage 33 is always higher than in the scavenge chamber 31 therebeyond.

The inlet end 38 of the outlet tube 27 defines a thin annulus which sharply separates clean core flow in passage 33 from contaminant-laden peripheral flow in annular passage 30.

Figure 4:
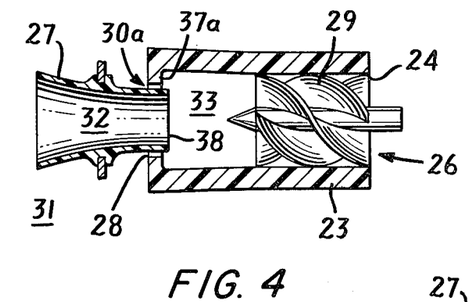
FIG. 4 is a longitudinal section through another embodiment of vortex air cleaner of the invention, in which the flow restrictor is on the tubular body.

The vortex air cleaner of FIG. 4 comprises a tubular body 23 having a central passage 33, an inlet 24 and an outlet 28. A vortex generator 26 is disposed within the central passage 33 adjacent the inlet 24. The housing 23 is made of glass-filled polypropylene.

The vortex generator 26 is integral with the tube 23. The vanes 29 are helical.

The generally tapered outlet tube 27 is disposed with one end extending into the outlet 28 of the passage 33. The outlet tube has a central open passage 32 therethrough for the removal of clean air. The outlet tube defines an annular passage 30a between the vortex tubular body 23 and the outer periphery of the outlet tube 27, for the removal of dirt particles.

A peripheral or circumferential flange 37a on the body 23 near the inlet end 38 of each outlet tube 27 constitutes a flow restrictor, and reduces the diameter of the annular passage 30a to an annular orifice. The flange 37a restricts flow through the passage 30a to ensure that the pressure in central passage 33 is always higher than in the scavenge chamber 31 therebeyond.

The inlet end 38 of the outlet tube defines a thin annulus which sharply separates clean core flow in passage 33 from contaminant-laden peripheral flow through passage 30a. Contaminants are carried past flange 37 into and through the passage 30, the annulus 38 preventing their being reflected into the clean air stream when encountering the flange 37.

Figure 5:
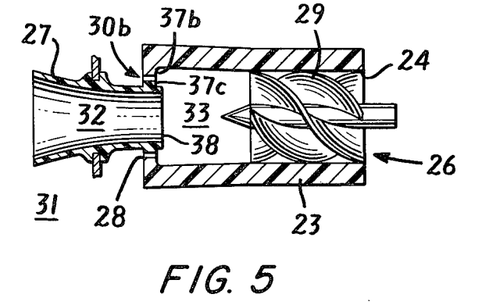
FIG. 5 is a longitudinal section through another embodiment of vortex air cleaner of the invention, in which the flow restrictor is partially on the tubular body and partially on the tubular outlet member.

The vortex air cleaner of FIG. 5 comprises a tubular housing 23 having a central passage 33, an inlet 24 and an outlet 28. A vortex generator 26 is integral with housing 23 and is disposed within the central passage 33 adjacent the inlet 24. The vanes 29 are helical. The housing 23 is made of asbestos-or glass-filled polypropylene.

The generally tapered outlet tube 27 is disposed with one end extending into the outlet 28 of the passage 33. The outlet tube has a central open passage 32 therethrough for the removal of clean air. The outlet tube defines an annular space 30b between the housing 23 and the outer periphery of the outlet tube 27, for the removal of dirt particles.

A pair of peripheral or circumferential flanges 37b, 37c on the tube 23 and outlet tube 27, respectively, near the inlet end 38 of each outlet tube constitutes a flow restrictor, and reduces the diameter of the annular passage 30b to an annular orifice. The flanges 37b, 37c restrict flow through the passage 30b to ensure that the pressure in central passage 33 is always higher than in the scavenge chamber 31 therebeyond.

The inlet end 38 of the outlet tube 27 defines a thin annulus which sharply separates clean core flow in passage 33 from contaminant-laden peripheral flow.

Contaminants are carried past flanges 37b and 37c into and through the passage 30b, the annulus 38 preventing their being reflected into the clean air stream when encountering the flange 37.

Figure 6:
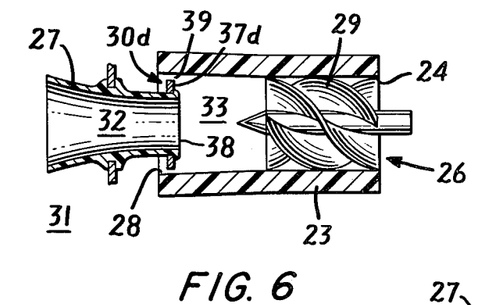
FIG. 6 is a longitudinal section through another embodiment of vortex air cleaner of the invention, in which the flow restrictor is a ring attached to the tubular outlet member.

The vortex air cleaner of FIG. 6 comprises a tubular housing 23 having a central passage 33, an inlet 24 and an outlet 28. A vortex generator 26 is integral with the housing 23 and is disposed within the central passage 33 adjacent the inlet 24. The vanes 29 are helical. The housing 23 is made of asbestos or glass-filled polypropylene.

The generally tapered outlet 27 is disposed with one end extending into the outlet 28 of the passage 33. The outlet tube has a central open passage 32 therethrough for the removal of clean air. The outlet tube defines an annular space 30d between the vortex housing 23 and the outer periphery of the outlet tube 27, for the removal of dirt particles.

A peripheral or circumferential ring 37d attached to the outlet tube 27 near the inlet end 38 constitutes a flow restrictor, and reduces the diameter of the annular passage 30d at the ring 37d to an annular orifice 39. The ring 37d restricts flow through the passage 30d to ensure that the pressure in central passage 33 is always higher than in the scavenge chamber 31 therebeyond.

The outlet end 38 of the outlet tube 27 defines a thin annulus which sharply separates clean core flow in passage 33 from contaminant-laden peripheral flow.

Contaminants are carried past flange 37d into and through the passage 30d, the annulus 38 preventing their being reflected into the clean air stream when encountering the flange 37d.

Figure 7:
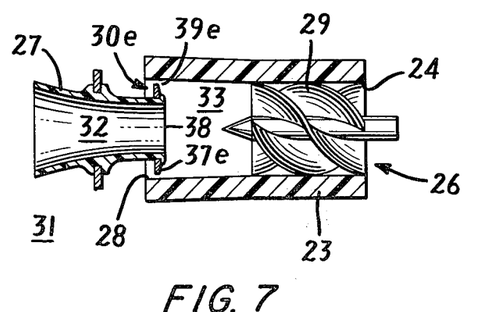
FIG. 7 is a longitudinal section through another embodiment of vortex air cleaner of the invention, in which the flow restrictor is a ring presenting a sloping surface to the contaminant-laden flow entering the annular passage.

The vortex air cleaner of FIG. 7 comprises a tubular housing 23 having a central passage 33, an inlet 24 and an outlet 28. A vortex generator 26 is integral with the housing 23 and is disposed within the central passage 33 adjacent the inlet 24. The vanes 29 are helical. The housing 23 is made of asbestos- or glass-filled polypropylene.

The generally tapered outlet tube 27 is disposed with one end extending into the outlet 28 of the passage 33. The outlet tube has a central open passage 32 therethrough for the removal of clean air. The outlet tube defines an annular space 30e between the vortex housing 23 and the outer periphery of the outlet tube 27, for the removal of dirt particles.

A peripheral or cimcumferential ring 37e attached to the outlet tube 27 near the inlet 38 constitutes a flow restrictor, and reduces the diameter of the annular passage 30e at the ring to an annular orifice 39e.

The ring 37e presents an inclined surface to flow entering the passage 30e, sloping towards the orifice 39e, to reflect particles striking it to the wall of the housing 23, and help to funnel flow into the orifice. The ring 37e restricts flow through the passage 30e, to ensure that the pressure in central passage 33 is always higher than in the scavenge chamber 31 therebeyond.

The inlet end 38 of the outlet tube 27 defines a thin annulus which sharply separates clean core flow in passage 33 from contaminant-laden peripheral flow. Contaminants are carried past flange 37e into and through the passage 30e, the annulus 38 preventing their being reflected into the clear air stream when encountering the flange 37e.

Figure 8:
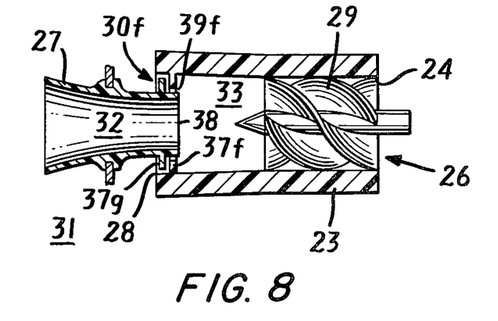
FIG. 8 is a longitudinal section through another embodiment of vortex air cleaner of the invention, in which the flow restrictor defines a tortuous annular orifice.

The vortex air cleaner of FIG. 8 comprises a tubular housing 23 having a central passage 33, an inlet 24, and an outlet 28. A vortex generator 26 is disposed within the central passage 33 adjacent the inlet 24. The housing 23 is made of asbestos- or glass-filled polypropylene.

The vortex generator 26 is made of filled polypropylene, and is bonded in position at the inlet by a resin adhesive. The vanes 29 are helical.

The generally tapered outlet tube 27 is disposed with one end extending into the outlet 28 of the passage 33. The outlet tube has a central open passage 32 therethrough for the removal of clean air. The outlet tube defines an annular space 30f between the vortex generator housing 23 and the outer periphery of the outlet tube 27, for the removal of dirt particles.

A pair of interdigitated peripheral or circumferential flanges 37f, 37g, one on the outlet tube 27 and one on the housing 23 near the inlet end 38, constitute a flow restrictor, and reduce the diameter of the annular passage 30f to a tortuous annular orifice or passage 39f. The flanges 37f, 37g restrict flow through the passage 30f to ensure that the pressure in central passage 33 is always higher than in the scavenge chamber 31 therebeyond.

The inlet end 38 of the outlet tube 27 defines a thin annulus which sharply separates clean core flow in passage 33 from contaminant-laden peripheral flow. Contaminants are carried past flange 37f into and through the passage 30f, the annulus 38 preventing their being reflected into the clean air stream when encountering the flange 37f.

As an example of the peformance of the vortex air cleaners of the invention, air containing A.C. Coarse Test Dust was induced through the array shown in FIGS. 1 to 3, at a rate of 1700 s.c.f.m. by a blower disposed downstream of the vortex separator tube array. A vortex was created in the stream of air passing through the separators and the dust particles were forced to the periphery of the tubes, leaving the air at the center relatively clean. The dust particles were drawn off from the annular orifice 30 between the outlet tube 27 and the tube 23, and a core of clean air was drawn off through the central passage 32 of the outlet tube. A pressure drop of only 2.6 inches water column occurred and the separation efficiency was 95%. This means that only 5 parts of 100 parts entered the engine.

The distance between the two plates 12, 13 was 2.26 inches and the inside diameter of the tubes was approximately 0.6 inch.

This result is to be compared with a vortex tubular separator array having the same size vortex air cleaners but without the flange 37. The pressure drop through the array was 2.96 inches water column at a flow of 1700 s.c.f.m., and the separation efficiency was 89%.

The difference in pressure drop is quite remarkable.

It is to be noted that although there is only a 6% difference in efficiency, this means that 11 parts of 100 parts enters the engine, or approximately 120% more dirt than would have entered, had the array of the invention been used.

The vortex air cleaners of the invention are particularly suited for removing dust and dirt particles from air entering diesel and gas turbine engines of earth-moving equipment, marine and over-the-road vehicles, stationary power plants, and aircraft and in any system in which the level of contaminant concentration in the air is high.

It is to be noted that although the tubular vortex separator arrays of this invention have been described in connection with removing dust particles from air, they are suitable for use in removing any solid or liquid contaminants from any gas, and the term "contaminant" as used herein refers to solid and liquid particles of any kind dispersed in a gas, and particularly air. The particles can be of any size that will pass through the air cleaner, but efficiency is greatest if the particles are of at least 10 to 20$\mu$ in size. The solids particles that can be removed include dust, dirt, pebbles and metal dust, bits, and chips, and the liquid particles include water, sea water, oil and fuel, to mention only a few.

Having regard to the foregoing disclosure the following is claimed as the inventive and patentable embodiments thereof:

1. An array of closely spaced vortex air cleaners for efficiently removing contaminant particles from relatively high velocity air with a low pressure drop comprising a housing defining a scavenge chamber therewithin; a plurality of vortex air cleaners in the housing arranged to receive contaminant-laden air and discharge clean air therefrom; the vortex air cleaners comprising a tubular body having an inlet and an outlet; an angularly vaned deflector disposed at the inlet, the deflector being adapted to create a vortex stream in the influent air to concentrate any contaminant particles in the air at the periphery of the tubular body, and provide a core of clean air at the center of the tubular body; a generally tubular outlet member coaxially disposed in the outlet of the tubular body and having an end of smaller diameter than the tubular body, defining a generally annular space therebetween through which pass contaminant particles at the periphery of the tubular body, while relatively clean air at the center of the tubular body passes through the central passage of the outlet member; the tubular outlet member defining an annular passage between it and the tubular body for reception of the contaminant particles in the peripheral flow through the central passage and discharge of such particles in the scavenge chamber; and a flow restrictor at the entry to the annular passage from the central passage and spaced downstream from the inlet end of the tubular outlet member a distance that is at least about 10% of the air inlet diameter of the tubular outlet member; the inlet end of the tubular outlet member terminating in a thin annulus cutting out and separating a core of clean air entering the tubular outlet member from a peripheral flow of contaminant-laden air entering the annular passage; and the flow restrictor defining an annular orifice at the entry to the annular passage maintaining a higher air pressure within the central passage than downstream in the savenge chamber.

2. An array of vortex air cleaners in accordance with claim 1, in which the ratio of the length of the central passage of the tubular body to the diameter of the central passage of the tubular body, measured in inches, is within the range from about 2.5 to about 3.5.

3. An array of vortex air cleaners in accordance with claim 1, in which the diameter of the central passage of the tubular body is within the range from about 0.5 to about 1.75 inches.

4. An array of vortex air cleaners in accordance with claim 1, in which the vaned deflector has four vanes supported on a central hub having a blunt tip extending upstream of the vanes.

5. An array of vortex air cleaners in accordance with claim 1, in which the deflector, the outlet member and the body are made of plastic material.

6. An array of vortex air cleaners in accordance with claim 1, in which the central passage of the tubular body is cylindrical and of uniform diameter from the inlet to the outlet.

7. An array of vortex air cleaners in accordance with claim 1, in which at least a portion of the central passage of the tubular body is tapered from the outlet to the inlet.

8. An array of vortex air cleaners in accordance with claim 1, in which the pitch length p1, in inches, of the vanes of the deflector, measured from end to end of the deflector, and the inside diameter $d$, in inches, of the central passage of the tubular body, gives K values within the range from about 2.2 to about 3.2 according to the equation
$$=Kd^{0.68}.$$

9. An array of vortex air cleaners in accordance with claim 1, in which the overall length of the tubular body is less than about 6 inches.

10. An array of vortex air cleaners in accordance with claim 1, in which the outlet member extends into the outlet end of the central passage of the tubular body for a distance that is from about 0.10 to about 0.25 times the diameter of the central passage.

11. An array of vortex air cleaners in accordance with claim 1, in which the flow restrictor defines an annular orifice having a width from about 2 to about 10% of the inside diameter of the central passage of the tubular body at the inlet end of the tubular outlet member.

12. An array of vortex air cleaners in accordance with claim 1, in which the flow restrictor is a circumferential flange or rib about the external periphery of the tubular outlet member.

13. An array of vortex air cleaners in accordance with claim 1, in which the flow restrictor is a circumferential flange or rib about the internal periphery of the tubular body.

14. An array of vortex air cleaners in accordance with claim 1, in which the flow restrictor extends the full length of the annular passage.

15. An array of vortex air cleaners in accordance with claim 1, in which the flow restrictor is placed partially on the tubular body and partially on the tubular outlet member, each portion projecting towards the other across the annular passage, and defining the annular orifice therebetween.

16. An array of vortex air cleaners in accordance with claim 15, in which the resulting orifice is straight-sided.

17. An array of vortex air cleaners in accordance with claim 15, in which the resulting orifice is in the form of a curved passage.

* * * * *

UNITED STATES PATENT OFFICE
CERTIFICATE OF CORRECTION

Patent No. 3,915,679          Dated October 28, 1975

Inventor(s) Charles J. Roach and Conrad A. Mitchell

It is certified that error appears in the above-identified patent and that said Letters Patent are hereby corrected as shown below:

| | | |
|---|---|---|
| Column 4, line 60 | : | "poolycarbonate" should be --polycarbonate-- |
| Column 5, line 10 | : | "body any " should be -- body by any-- |
| Column 5, line 53 | : | after "and" please insert --high efficiency. Acceptable efficiencies however with low-- |
| Column 7, line 21 | : | "scavenger" should be --scavenge-- |
| Column 7, line 36 | : | "slected" should be --selected-- |
| Column 9, line 35 | : | "apertues" should be --apertures-- |
| Column 11, line 19 | : | "cimcumferential" should be --circumferential-- |
| Column 14 line 3 | : | "p1" should be --P1-- |
| Column 14, line 6 | : | "gives" should be --give-- |
| Column 14, line 9 | : | "$=Kd^{0.68}$" should be --$P1=Kd^{0.68}$-- |

Signed and Sealed this

Third Day of August 1976

[SEAL]

Attest:

RUTH C. MASON
Attesting Officer

C. MARSHALL DANN
Commissioner of Patents and Trademarks